United States Patent
Beattie

(10) Patent No.: US 6,851,899 B2
(45) Date of Patent: Feb. 8, 2005

(54) CRANKSHAFT KEYING FIXTURE AND METHOD

(76) Inventor: James C. Beattie, 6747 Whitestone Rd., Baltimore, MD (US) 21207

( * ) Notice: Subject to any disclaimer, the term of this patent is extended or adjusted under 35 U.S.C. 154(b) by 267 days.

(21) Appl. No.: 10/122,300

(22) Filed: Apr. 16, 2002

(65) Prior Publication Data
US 2002/0150435 A1 Oct. 17, 2002

Related U.S. Application Data
(60) Provisional application No. 60/283,649, filed on Apr. 16, 2001.

(51) Int. Cl.[7] .............................................. B23B 49/02
(52) U.S. Cl. .............................. 408/72 B; 408/115 R; 408/241 B
(58) Field of Search ............................ 408/1 R, 72 R, 408/72 B, 97, 115 R, 115 B, 241 B, 103, 104; 409/177

(56) References Cited

U.S. PATENT DOCUMENTS

| 190,042 | A | * | 4/1877 | Hurd ............................ 408/97 |
| 828,948 | A | | 8/1906 | Matheus |
| 1,532,650 | A | | 4/1925 | Brewer |
| 2,309,765 | A | | 2/1943 | Haase |
| 2,363,085 | A | | 11/1944 | Roye |
| 2,373,341 | A | | 4/1945 | Rowe |
| 2,602,375 | A | | 7/1952 | Holt |
| 2,913,933 | A | * | 11/1959 | Bosse ............................. 408/8 |
| 2,917,331 | A | | 12/1959 | Baer |
| 3,085,476 | A | | 4/1963 | Sloan |
| 3,466,972 | A | | 9/1969 | Strait |
| 3,713,747 | A | * | 1/1973 | Haselmo ................. 408/115 R |
| 3,743,433 | A | * | 7/1973 | Smith ....................... 408/72 R |
| 4,022,106 | A | | 5/1977 | Kile |
| 4,289,434 | A | | 9/1981 | Piper |
| 4,431,017 | A | | 2/1984 | Willemsen |
| 4,557,644 | A | | 12/1985 | Scepanovic |
| 4,778,316 | A | | 10/1988 | Strait |
| 5,185,917 | A | | 2/1993 | Kremen |
| 5,893,686 | A | | 4/1999 | Weiler |
| 6,095,730 | A | | 8/2000 | Asa |
| 6,669,413 | B1 | * | 12/2003 | Neeld et al. .................. 408/79 |
| 6,705,808 | B2 | * | 3/2004 | Kane ......................... 408/72 B |

FOREIGN PATENT DOCUMENTS

| JP | 3-196907 | * | 8/1991 | ............ 408/115 R |
| SU | 1098684 | * | 6/1984 | ................. 408/97 |

* cited by examiner

Primary Examiner—Daniel W. Howell
(74) Attorney, Agent, or Firm—Davidson Berquist Klima & Jackson, LLP

(57) ABSTRACT

A fixture and method allows a mechanic to add a key to a crankshaft without removal of the crankshaft from the engine. The keying fixture has a main body having an axial internal bore for mounting over a crankshaft. The main body includes a sealing portion for forming a seal between the engine and the keying fixture to prevent debris from the keying operation from entering the engine. The main body also includes a bushing mounting portion for mounting drilling/reaming bushings of a desired size in the keying fixture to provide for precise radial alignment of a correspondingly sized drill bit or reamer used for creating a radial key bore.

17 Claims, 2 Drawing Sheets

CRANKSHAFT KEYING FIXTURE AND METHOD

This application claims priority to U.S. Provisional Patent Application No. 60/283,649 filed on Apr. 16, 2001, which application is incorporated by reference herein.

BACKGROUND OF THE INVENTION

The present invention relates to a fixture and method for keying a keyless shaft and specifically, to keying a keyless engine crankshaft.

Most automotive engines utilize a harmonic damper installed on the end of the crankshaft to counteract torsion and vibration inherent in the rotating crankshaft. In the past, the crankshaft was usually provided with a key so that the harmonic damper having a keyway could be keyed to the crankshaft to prevent rotation of the harmonic damper with respect to the crankshaft. A bolt threaded into the end of the crankshaft then locked the harmonic damper to the crankshaft. Currently, certain engines, including specifically, the high performance LS1® engine from Chevrolet®, are not provided with keyed crankshafts or harmonic dampers. Rather, the harmonic damper is not keyed to the crankshaft but is merely bolted onto the end of the crankshaft with no specific angular orientation with respect to the crankshaft. However, under certain high performance operating conditions, it has been found that the harmonic damper can spin on the crankshaft with undesirable consequences. This has been found to be especially the case for LS1® engines that are supercharged, with the supercharging blower being belt driven by a pulley mounted to the harmonic damper. The increased forces imposed on the harmonic damper from driving the blower can overcome the unkeyed connection and cause the harmonic damper to rotate on the crankshaft. Such rotation results in decreased power output, rapidly destruction of the crankshaft and harmonic damper and can even cause catastrophic engine failure because of crankshaft breakage.

In the past, the only effective way to key a keyless crankshaft, or add a key to a keyed crankshaft, was to remove the crankshaft from the engine for machining. This is time consuming, expensive and opens the interior of the engine to risk of contamination.

SUMMARY OF THE INVENTION

The present invention is a fixture and method for allowing a mechanic to easily key a keyless crankshaft, or add a key to a keyed crankshaft, in the field without removal of the crankshaft from the engine. This allows the harmonic damper to be keyed to the crankshaft to prevent rotation of the harmonic damper with respect to the crankshaft, especially under severe operating conditions.

The keying fixture has a main body having an axial internal bore for mounting over a crankshaft with the same bolt used to mount the harmonic damper. The main body includes a seal engaging outer portion for forming a seal between the front main seal of the engine and the keying fixture to prevent debris from the keying operation from entering the engine. The main body also includes a bushing mounting portion for mounting drilling/reaming bushings of a desired size in the keying fixture to provide for precise radial alignment of a correspondingly sized drill bit or reamer used for creating a radial key bore.

It is an object of the present invention to provide a crankshaft keying fixture that can be used to key a keyless crankshaft, or add a key to an already keyed crankshaft, without removing the crankshaft from the engine.

It is another object of the present invention to provide a crankshaft keying fixture that can be easily used by a mechanic to key a keyless crankshaft, or add a key to an already keyed crankshaft, utilizing only simple hand tools readily available to the mechanic.

It is another object of the present invention to provide a crankshaft keying fixture that can be easily used to key a keyless crankshaft, or add a key to an already keyed crankshaft, without removing the crankshaft from the engine while preventing contamination of the interior of the engine by debris created during the keying operation.

DETAILED DESCRIPTION OF THE INVENTION

Figure 1:
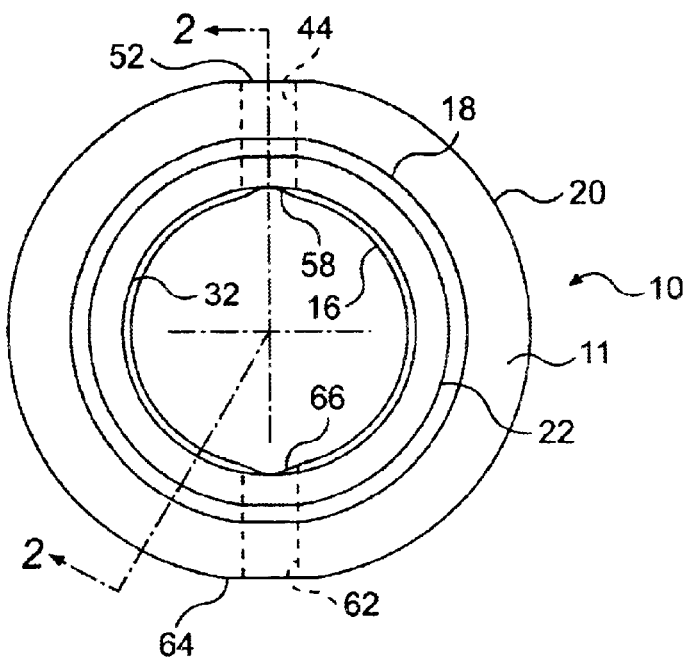
FIG. 1 is an elevational end view of a keying fixture of the present invention.
Figure 2:
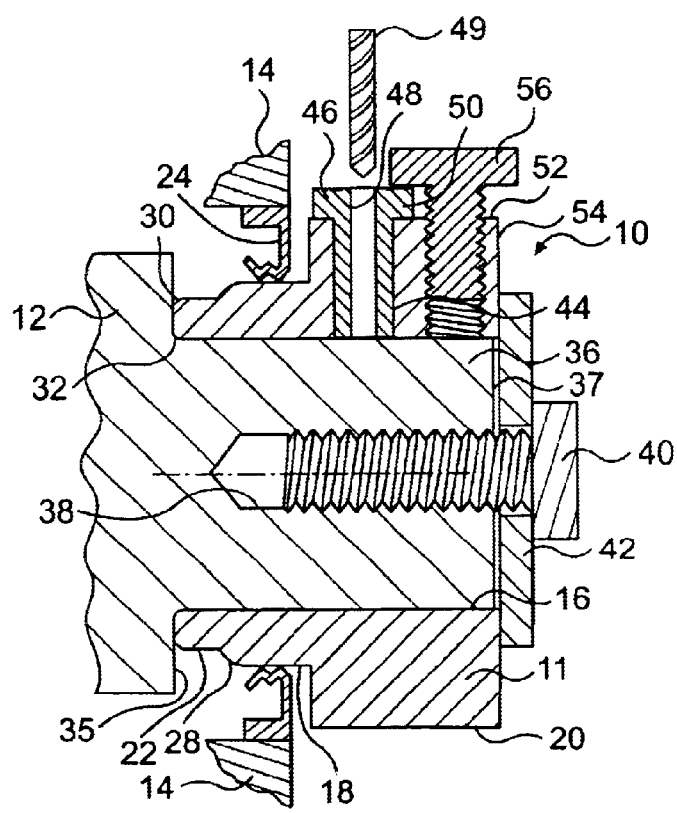
FIG. 2 is a sectional side view of the keying fixture of the present invention taken along sectional line 2—2 in FIG. 1.
Figure 3:
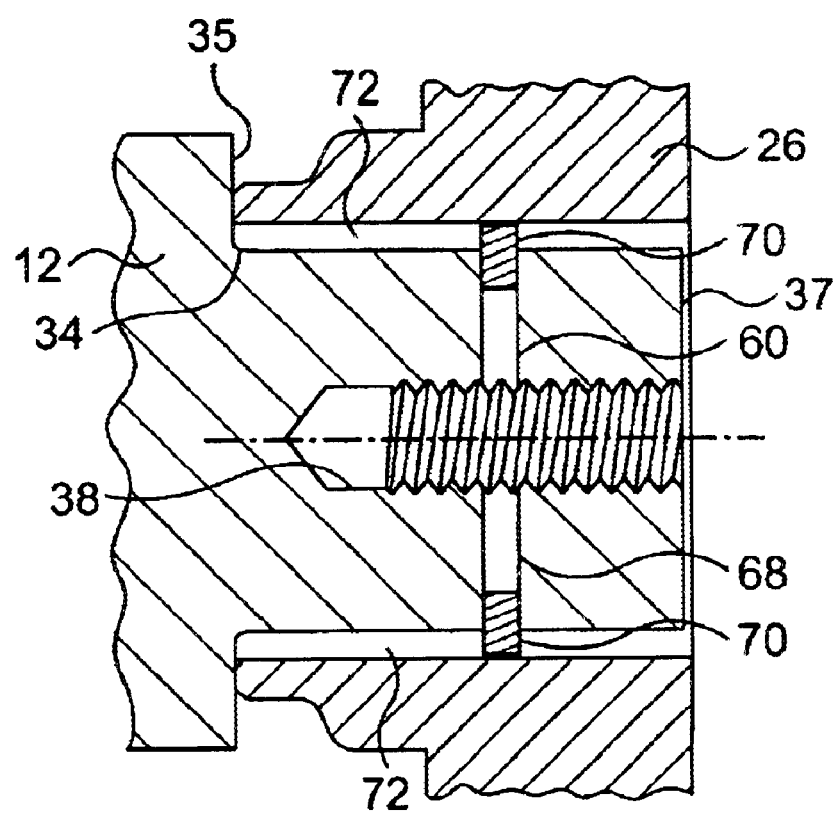
FIG. 3 is a partial sectional side view of an engine having a crankshaft keyed utilizing the present invention.

A crankshaft keying fixture 10 is shown in FIGS. 1 and 2. In FIG. 2, the keying fixture 10 is shown mounted on the end of a crankshaft 12 of engine 14 for the keying operation. As is conventionally known, engine 14 also includes a front main seal 24 for providing an oil seal between a harmonic damper 26 (see FIG. 3) and engine 14. Crankshaft 12 includes an end face 35, an axially extending damper mounting portion 36 having end face 37 and a threaded axial bore 38 for accepting harmonic damper mounting bolt 40 and washer 42.

The keying fixture 10 has an internal axial bore 16 that is sized to provide a snug fit on the shaft to be keyed. For keying an LS1® crankshaft, the internal bore 16 is approximately 1.484 inches in diameter. Of course, this bore can be altered for keying other crankshafts or other types of shafts. Keying fixture 10 has a main body 11 having a generally cylindrical seal engaging portion 18, a generally cylindrical bushing mounting portion 20 and a generally cylindrical third portion 22, with the seal engaging portion 18 disposed axially between the bushing mounting portion 20 and the third portion 22. To prevent damage to the front main seal 24 when the keying fixture is installed on the crankshaft 12, a leading outer edge 28 of the seal engaging portion 18 is smoothly radiused and an outer surface of the seal engaging portion 18 is polished smooth. This allows the edge 28 to easily slide past the front main seal 24 without damaging the seal as the keying fixture 10 is slid onto the crankshaft 12. The provision of seal engaging portion 18 to engage front main seal 24 prevents metal chips and debris created during the keying operation from entering the engine between the seal 24 and the crankshaft 12. Alternatively, the keying fixture can contact another portion of the seal 24 and/or the engine 14 to seal the interior of the engine from debris created during the keying operation and can include additional components, such as foam or polymeric gaskets or seals to effectuate the seal.

A leading outer edge 30 of third portion 22 is chamfered or radiused to remove a sharp edge that could potentially nick or damage seal 24 or some other engine component as the keying fixture 10 is mounted on the crankshaft 12. In an alternative embodiment, the third portion 22 can be omitted and the seal engaging portion 18 extended to the end of the keying fixture 10. A leading edge 32 of internal bore 16 is also chamfered or radiused to accommodate an opposing radiused portion 34 of crankshaft 12 (see FIG. 3). An axial length of the keying fixture 10 is slightly longer than a length of the damper mounting portion 36 between end faces 35 and 37 so that when positioned on the crankshaft damper mounting portion 36, the keying fixture 10 can be tightly clamped mounted to the crankshaft 12 with the bolt 40 and washer 42.

The generally cylindrical bushing mounting portion 20 includes a first radial bushing bore 44 for accepting a conventional drilling/reaming bushing 46 having a sized internal bore 48 and a flange portion 50. The sized internal bore 48 accepts a correspondingly sized drill bit or reamer 49 and provides proper radial alignment of the drill bit or reamer 49 when creating a keying bore 58 in the crankshaft 12. A portion of an outer surface of the bushing mounting portion 20 is flattened normal to an axis of bore 44 to provide a first stable engaging surface 52 for bushing flange portion 50. The bushing mounting portion 20 also includes a first threaded radial holding screw bore 54 for accepting a holding screw 56 that is used to securely clamp the bushing 46 in place once installed in the bore 44. The internal bore 16 is provided with a first axially extending groove 58 positioned beneath the bore 44 for accommodating drilling and reaming debris created during the keying procedure. The keying fixture is preferably provided with a second radial bushing bore 62, a second engaging surface 64, a second threaded radial holding screw bore and a second internal axially extending groove 66, all positioned in the keying fixture 10 at 180° from their first counterparts.

The method of using the keying fixture will now be explained. First, the crank bolt 40, washer 42 and harmonic damper 26 are removed from the engine. The keying fixture 10 is then slid onto the damper mounting portion 36 of crankshaft 12, taking care not to damage the front main seal 24 in the process. The keying fixture should be rotated as necessary to position the first radial bushing bore 44 for best drill access. The crank bolt 40 and washer 42 are then reinstalled in the crankshaft 12 and tightened to lock the keying fixture 10 in place. A first sized drilling/reaming bushing 46 is installed in the bushing bore 44 and the holding screw 56 is threaded into bore 54 to snugly hold the drilling bushing 46 in place. The correspondingly sized drill bit 49 is then installed in a drill, positioned in the bore 48 of the bushing 46 and a radial hole is drilled in the crankshaft 12 through to the center bore 38. In the preferred embodiment, the first drilling/reaming bushing 46 and drill bit 49 are correspondingly sized at 11/64 inch to create an initial radial bore having a diameter of 11/64 inch. The first drilling/reaming bushing 46 is then removed and a larger final sized drilling/reaming bushing 46 is installed in the keying fixture 10. A correspondingly sized reamer 49 is then inserted in the drill, positioned in the bushing 46 and used to ream the initially sized radial bore to the desired final size with a single in and out pass at low RPM. In the preferred embodiment, the larger final drilling/reaming bushing 46 and reamer 49 are correspondingly sized at 3/16 inch to create a final radial bore 60 having a diameter of 3/16 inch.

If a second keying pin is desired for additional strength in preventing rotation of the harmonic damper 26 on the crankshaft 12, the crankshaft 12 is rotated 180° and the above steps repeated to create a second final radial bore 68 having a diameter of 3/16 inch. To prevent misalignment of the two bores, it is important to rotate the crankshaft 12 only to create the second bore without loosening the bolt 40. The keying fixture 10 must remain locked to the crankshaft 12 until both radial bores 60 and 68 are finished.

Upon finishing the metal removal steps, the bolt 40 and washer 42 are removed and the outside of the engine 14 and keying fixture 10, as well as the internal bore 38, are blown clean of all metal chips and debris prior to removing the keying fixture 10 from the crankshaft 12. This prevents such metal chips and debris from entering the engine 14 between seal 24 and crankshaft 12. The keying fixture 10 can then be removed from the crankshaft 12 and any remaining debris carefully removed, taking caution to prevent such debris from entering the interior of the engine. A keying pin 70 can then be installed in each of the final radial bores to a desired protruding height. In the preferred embodiment, the keying pins are 3/16 inch in diameter and ½ inch long, have an interference fit with each of the final radial bores and are installed in each of the final radial bores so as to protrude 0.093 inches above a surface of the crankshaft to engage corresponding keyways 72 in the harmonic damper 12.

The harmonic damper 26 can then be installed on the crankshaft 12 with the keyways 72 engaging keying pins 70. In the preferred embodiment, the damper 26 is pulled tight to the crankshaft 12 with the old bolt 40 tightened to a torque of 200 ft/lbs. The old bolt is then removed, a new bolt 40 installed with red #262 Loctite® and torqued to 240–250 ft/lbs.

The keying fixture 10 allows a crankshaft 12 to be easily keyed without removal from the engine. This provides a substantial time and cost advantage over other keying methods that require removal of the crankshaft from the engine for machining. The keying fixture also prevents the risk of contaminating the interior of the engine with debris from the keying operation that could cause expensive and even catastrophic damage to the engine. The keying fixture is rugged and is reusable on multiple crankshafts. It is preferably made of steel but need not be especially hardened because of the use of the replaceable drilling/reaming bushings 46. The keying fixture 12 can be made of other materials and can be coated or treated, if desired, to prevent corrosion. It is intended that lubricants or cutting oils not be required for performing the keying operation, as such lubricants can retain chips and debris, thereby risking that such contaminants may enter the engine. However, in appropriate circumstances, lubricants and cutting oils can be used. Although described with respect to keying a crankshaft, the fixture can be sized differently and used to key other types of shafts. In the embodiment intended for use with an LS1® crankshaft, the seal engaging portion 18, the bushing mounting portion 20 and the third portion 22 have outer diameters of approximately 2.130 inches, 2.800 inches and 1.955 inches, respectively and the keying fixture 12 has an overall length of approximately 1.750 inches. Although the keying fixture 10 is disclosed as having one or two radial bushing bores, three or more bushing bores can be provided spaced equally or nonequally circumferentially around the keying fixture. The keying fixture 10 can also be provided with additional bushing bores axially spaced apart for creating axially spaced key bores in the crankshaft.

What is claimed is:

1. A crankshaft keying fixture, comprising:
    a main body comprising:
        an internal axial bore, the axial bore constructed and arranged to slide over an exposed end of a crankshaft assembled in an engine, the axial bore sized to provide a desired tolerance between the axial bore and the exposed crankshaft end;
        a generally cylindrical seal engaging portion constructed and arranged to engage a crankshaft seal surrounding the crankshaft when the crankshaft keying fixture is placed in a desired position on the crankshaft end to key the crankshaft such that the seal engaging portion seals a clearance between the crankshaft and the crankshaft seal, thereby sealing an interior of the engine during keying of the crankshaft; and a keying portion constructed and arranged to guide a cutting tool into the crankshaft at a desired angle.

2. A crankshaft keying fixture as in claim 1, wherein the keying portion comprises:

a bushing mounting portion;

at least one radially aligned bushing bore positioned in the bushing mounting portion; and at least one drilling/reaming bushing constructed and arranged to be inserted into the bushing bore at a desired tolerance such that a cutting tool inserted through the drilling/reaming bushing is maintained at a radial angle with respect to the crankshaft end.

3. A crankshaft keying fixture as in claim 2, wherein the keying portion further comprises:

a threaded radially aligned bore positioned adjacent the radially aligned bushing bore and constructed and arranged to receive a holding screw to clamp the drilling/reaming bushing between the holding screw and the bushing mounting portion.

4. A crankshaft keying fixture as in claim 3, wherein:

the drilling/reaming bushing includes a flange portion having a diameter greater than a diameter of the radially aligned bushing bore; and a portion of the bushing mounting portion is flattened normal to an axis of the axial bore, the flattened portion positioned around the radially aligned bushing bore to provide a stable engaging surface for the flange portion of the drilling/reaming bushing.

5. A crankshaft keying fixture as in claim 4, wherein the keying portion comprises:

a second radially aligned bushing bore positioned in the bushing mounting portion spaced around a circumference of the bushing mounting portion at a desired angle with respect to the at least one radially aligned bushing bore, the second radially aligned bushing bore constructed and arranged to receive at least one drilling/reaming bushing at a desired tolerance such that a cutting tool inserted through the drilling/reaming bushing is maintained at a radial angle with respect to the crankshaft end at the desired angle from the at least one radially aligned bushing bore.

6. A crankshaft keying fixture as in claim 5, wherein the keying fixture is constructed and arranged such that it can be securely clamped to the crankshaft end by a crank bolt axially threaded into the crankshaft end.

7. A crankshaft keying fixture as in claim 6, wherein an axial length of the keying fixture is longer than a length of a damper mounting portion of the crankshaft such that the keying fixture can be securely clamped to the crankshaft end by the crank bolt.

8. A crankshaft keying fixture as in claim 7, wherein the axial bore includes an axially extending groove positioned beneath each bushing bore constructed and arranged to receive and accommodate cutting debris created during keying.

9. A crankshaft keying fixture as in claim 8, wherein a leading edge of the seal engaging portion is chamfered and an exterior surface of the seal engaging portion is polished smooth.

10. A crankshaft keying fixture as in claim 9, wherein the main body further comprises a generally cylindrical third portion extending axially from the seal engaging portion and having a diameter smaller than a diameter of the seal engaging portion.

11. A crankshaft keying fixture as in claim 1, wherein the keying fixture is constructed and arranged such that it can be securely clamped to the crankshaft end by a crank bolt axially threaded into the crankshaft end.

12. A crankshaft keying fixture as in claim 11, wherein an axial length of the keying fixture is longer than a length of a damper mounting portion of the crankshaft such that the keying fixture can be securely clamped to the crankshaft end by the crank bolt.

13. A crankshaft keying fixture as in claim 1, wherein the axial bore includes an axially extending groove positioned beneath the bushing bore constructed and arranged to receive and accommodate cutting debris created during keying.

14. A crankshaft keying fixture, comprising:

a main body comprising:

an internal axial bore, the axial bore constructed and arranged to slide over an exposed end of a crankshaft assembled in an engine, the axial bore sized to provide a desired tolerance between the axial bore and the exposed crankshaft end;

a sealing portion constructed and arranged to engage at least one engine component when the crankshaft keying fixture is placed in a desired position on the crankshaft end to key the crankshaft such that the sealing portion seals a clearance between the crankshaft and a crankshaft seal, thereby sealing an interior of the engine during keying of the crankshaft; and a keying portion constructed and arranged to guide a cutting tool into the crankshaft at a desired angle.

15. A crankshaft keying fixture as in claim 14, wherein the at least one engine component is the crankshaft seal.

16. A crankshaft keying fixture as in claim 15, wherein the keying portion comprises:

a bushing mounting portion;

at least one radially aligned bushing bore positioned in the bushing mounting portion; and at least one drilling/reaming bushing constructed and arranged to be inserted into the bushing bore at a desired tolerance such that a cutting tool inserted through the drilling/reaming bushing is maintained at a radial angle with respect to the crankshaft end.

17. A crankshaft keying fixture as in claim 14, wherein the keying portion comprises:

a bushing mounting portion;

at least one radially aligned bushing bore positioned in the bushing mounting portion; and at least one drilling/reaming bushing constructed and arranged to be inserted into the bushing bore at a desired tolerance such that a cutting tool inserted through the drilling/reaming bushing is maintained at a radial angle with respect to the crankshaft end.

* * * * *